(12) United States Patent
O'Connor

(10) Patent No.: US 6,237,087 B1
(45) Date of Patent: May 22, 2001

(54) METHOD AND APPARATUS FOR SPEEDING SEQUENTIAL ACCESS OF A SET-ASSOCIATIVE CACHE

(75) Inventor: Dennis M. O'Connor, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/164,134

(22) Filed: Sep. 30, 1998

(51) Int. Cl.[7] .................................................. G06F 9/32
(52) U.S. Cl. .................... 712/226; 712/208; 712/211; 712/233; 712/237; 712/239; 712/240
(58) Field of Search .................... 712/208, 211, 712/226, 233, 237, 239, 240

(56) References Cited

U.S. PATENT DOCUMENTS

| 5,263,153 | * | 11/1993 | Intrater et al. | 714/51 |
|---|---|---|---|---|
| 5,295,248 | * | 3/1994 | Miyamori | 712/239 |
| 5,768,574 | * | 6/1998 | Dutton et al. | 712/226 |
| 5,819,080 | * | 10/1998 | Dutton et al. | 712/239 |
| 5,835,754 | * | 11/1998 | Nakanishi | 712/239 |
| 5,918,045 | * | 6/1999 | Nishii et al. | 711/213 |
| 6,108,773 | * | 8/2000 | Col et al. | 712/237 |

OTHER PUBLICATIONS

Chen et al, "Microarchitecture Support for improving The Performance of Load Target Prediction", IEEE, pp. 228–234, 1997.*

* cited by examiner

*Primary Examiner*—Daniel H. Pan
*Assistant Examiner*—Dzung C. Nguyen
(74) *Attorney, Agent, or Firm*—Blakely, Sokoloff, Taylor & Zafman LLP

(57) ABSTRACT

An embodiment of the invention is directed at a method for accessing a cache by detecting a branch instruction having an address and containing a first set of bits representing a displacement value, and generating a modified instruction containing a second set of bits representing a combination based on the first set of bits and the address.

18 Claims, 4 Drawing Sheets

METHOD AND APPARATUS FOR SPEEDING SEQUENTIAL ACCESS OF A SET-ASSOCIATIVE CACHE

BACKGROUND OF THE INVENTION

1. Field of the Invention

This invention is related to the field of use of caches. More particularly, this invention is directed to a method and apparatus for speeding sequential access of a set-associative cache in a pipelined processor.

2. Description of Related Art

Currently, many processors are implemented with a pipelined architecture. These pipelined processors may also include one or more caches, such as an instruction cache for storing instructions for faster access. In such an architecture, there are distinct steps that an instruction undergoes as it is processed. Typically, these include: (1) loading the instruction from main memory into the instruction cache; (2) fetching the instruction from the instruction cache; (3) decoding the instruction; and (4) executing the instruction.

One instruction that often needs to be processed is an instruction pointer (IP) relative branch instruction. IP-relative branch instructions are conditional or unconditional branch instructions that compute the target address of the branch (the address of the next instruction to be executed if the branch is taken, also known as the "branch target") by adding a value extracted from the branch instruction itself to the address contained in the instruction pointer (which is address of the branch instruction). The IP-relative branch instruction is a common form of branch instruction in many computer instruction sets. In this context, branch instructions may include call and branch-and-link instructions.

The computation of the target address typically occurs in either the instruction decode step or in a subsequent execution step. FIG. 1 contains a target address computation unit 100 that illustrates how this processing occurs. Target address computation unit 100 contains an IP register 110; a direct-mapped cache 112 including a set of cache tags 114, cache data 116 and a hit detection unit 117; a decoder 118; an adder 120 for calculating the branch target address; an incrementer 122 for handling non-branch cases; and a selector 124 that determines whether the next IP is obtained from incrementer 122 or adder 120. For an IP-relative branch, the circuit shown in FIG. 1 functions by beginning with some number of the less-significant bits (LSb's) of the IP (but not necessarily the least significant bits), sufficient to select one line from the plurality of lines in cache 112, being sent to the address inputs of the storage arrays that hold set of cache tags 114 and cache data 116. The remaining more significant bits (MSb's) of the IP are sent to hit detection unit 117, where they are compared with the tag of the accessed cache line to determine whether a cache hit occurred (that is, whether the instruction referenced by the IP is contained in cache 112).

Assuming a hit occurred, decoder 118 determines whether the instruction is a branch instruction and sends the displacement from the instruction word that is read out of cache 112 to adder 120. The displacement is then added to the IP. Assuming the branch is taken, selector 124, which is under control of other logic (not shown), routes the output of adder 120 to IP register 110, where it becomes the next IP when the load signal is sent to IP registers 110. If the instruction is not a branch instruction or if the instruction contains a branch that is not taken, then the output of incrementer 122 becomes the next IP.

FIG. 1 illustrates shows the operation of a typical instruction cache. Two separate processes are involved: the process by which information is placed in the instruction cache, and the process by which information is fetched from the instruction cache. The two arrows coming into the top of cache 112 represent the process of putting information into cache 112. The information consists of an address and the data that is contained in that address in a main memory. Assuming cache 112 is a simple cache where cache lines are filled all at once, information is placed in the set-associative cache by the following process:

1) The set that the address belongs to is determined. The set is a function of a group of bits in the address. Generally, these are the least significant bits beyond those bits needed to identify an offset within the cache line, sufficient to address all the sets in the cache. For example, if a cache line is 32 bytes, then 5 bits of address are needed to identify where in the cache line data is, so the sixth bit and up are used to select which set to use. If there are 128 sets (the number of sets is essentially always a power of two) then 7 bits would be needed to select one set. In this example, the sixth through twelfth least significant bits would select which set to use.
2) A line within that set is chosen. The selection of which line to use can be done via a number of different algorithms, such as Least-Recently-Used, Least-Recently-Written, Circular, or another algorithm that is known by one of ordinary skill in the art. In a direct mapped cache, there is only one line per set, so the selection process is trivial.
3) The data is written into the selected cache line's data storage, and the more significant bits (those not used in the selection of a byte within a line nor in the selection of which set to use) are placed in the tag for that line.

One exemplary process of fetching information from cache 112 proceeds as follows:

1) The address of the next information desired from cache 112 is generated. If a branch has not occurred, this is done by incrementing the previous address that was used. If a branch has occurred, then the computed target address of the branch is used. For the type of branches covered by this invention, the branch target address is generated by adding a displacement contained within the instruction to the address of the instruction (or, in some architectures, the address of the next instruction that would have been executed if the branch had not been taken.) The displacement is extracted from the instruction via decoder 118. Incrementer 122, adder 120, selector 124 and IP Register 110 of FIG. 1 are used to perform the function of generating the needed address, under the control of logic not shown in the diagram. If another form of branch is possible (such as a return from subroutine, or, a branch to an address specified by a general purpose register), then another input to selector 124 would be used to route the address generated by that branch into the circuit. This is not shown in the diagram but is obvious to one of ordinary skill in the art.
2) The bits of the generated address needed to select the set are fed into cache 112. In the example given above, these are the sixth through twelfth least significant bits. These bits select the lines belonging to one set, all of which then drive their tags and data out.
3) The tags coming out of the lines are compared to the more significant bits (in the example, the thirteenth least significant bit and all more significant bits) to determine whether a cache hit has occurred. If one of the lines from the set produces a hit, then the needed data is selected from its data using the least significant bits below those used to select the set (the fifth least significant bit and those bits less significant than it).

4) This fetched data is then fed into decoder 118, as described for first step of execution.

In an address computation unit such as target address computation unit 100 of FIG. 1, the cache access and the decode/adder stages would often be implemented in separate pipestages. Thus, a target address of a branch instruction is not immediately available at the beginning of the clock cycle after the cycle in which instruction was fetched from cache 112. This in turn means that the instruction that would be executed immediately after the branch, if the branch is taken, can not be fetched in the cycle after the branch instruction was fetched. This causes one or more clock cycle during which no new instruction is issued into the execution stages of the pipeline. This problem has been termed a "control hazard".

In one attempt to overcome problems such as control hazards, a "branch-target buffer" may be provided. However, branch-target buffers are generally expensive and complex devices. Thus, branch target buffers generally contain many devices, which also adds cost and complexity to the testing and deployment phases of the integrated circuit.

A more efficient mechanism for speeding sequential access of a set-associative cache in a pipelined processor is thus desired.

SUMMARY

An embodiment of the invention is directed at a method for accessing a cache by detecting a branch instruction having an address and containing a first set of bits representing a displacement value, and generating a modified instruction containing a second set of bits representing a combination based on the first set of bits and the address.

DETAILED DESCRIPTION

The described system takes advantage of the fact that the target address of an IP-relative branch may be determined entirely by the instruction itself and the address from which the instruction was fetched. Typically, the information is available within a processor anytime after the instruction has been fetched from main memory and before the instruction is actually loaded into the instruction cache. Therefore, the processor could recognize that a word just loaded from memory was an IP-relative branch. The processor could then pre-compute the target address of that branch using the address of the instruction and whatever portion of the instruction specifies the offset, and then store the pre-computed target address for later use at the same time as it stored the fetched instruction into the instruction cache. One problem that arises is how to provide storage for the pre-computed target address, which in its entirety might be significantly larger than the instruction itself.

The described system takes advantage of the nature of set-associative caches (which includes direct-mapped caches as those are set-associative caches containing only 1 set), and the reversibility of the target address calculation, to store the necessary portion of the pre-computed target address with only a small increase in the amount of storage needed. The relevant feature of a set-associative cache is that only a part of the address, generally the less-significant bits, is used to determine which line or lines of the cache information will be found in, and which section of the line or lines the desired data might be in. Thus, data may be fetched from a set-associative cache without knowing what some of the more-significant bits of the address are. These more-significant bits are used to confirm whether the data fetched from the cache is the desired data, and not where in the cache from which to fetch the data.

If enough of the target address of the branch is pre-computed to identify where in the cache the target of the branch might be found, then that information may be fed directly into the cache address lines without needing an addition step. Then, as the access to the cache storage cells is proceeding, an add may be performed that generates the remaining bits of the branch address that are used to determine if the data fetched is really the data desired.

Figure 2:
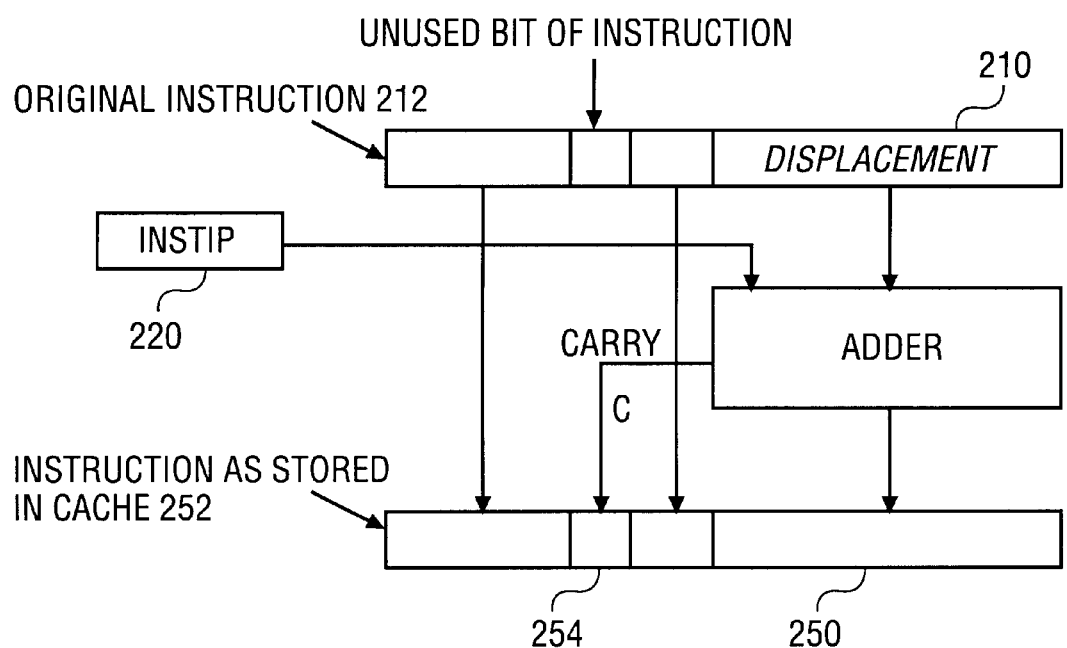
FIG. 2 is a diagram of a transformation of an instruction in accordance with one embodiment of the present invention.

Assuming that the displacement in the branch instruction contains sufficient bits to completely determine the location (s) in the cache that might hold the instruction at the target address of the branch, then the displacement may be added to the IP of the instruction that contains it before it is stored into the cache, and the result of that addition used to replace the displacement within the cache. However, the addition may produce a carry that must be preserved. Thus, it may be possible to use an otherwise unused bit in the instruction to contain this carry, as shown in FIG. 2; or by using unused opcodes to distinguish, for example, a partly pre-computed branch with a carry from one without. Failing that, extra bits may be added to the instruction cache to store the carry. These bits may be added to every instruction-sized storage unit in the cache, or kept in a separate pre-computed-carry cache, accessed via the branch instruction's IP, to save space.

FIG. 2 shows an example where the number of bits used in the pre-calculation of a branch target address 250 contained in a cached instruction 252 is the same as the number of bits in a displacement 210 contained in an original instruction 212. If there are more bits in displacement 210 than are needed to access the cache, the upper bits of displacement 210 can be preserved as-is, and used in the computation of the upper bits of branch target address 250 while cache access is occurring. FIG. 2 shows the transformation made to original instruction 212 of the "IP+displacement" form covered by this invention. Some or all of the bits of displacement 210, including enough to select a set in the cache and any bits less significant than those, are added to the corresponding bits in address 220 of original instruction 212. If the architecture uses, for example, the address of the next sequential instruction in this calculation, then bits from that address are used instead. Generally the address of the next instruction is equal to the address of the current instruction plus a small fixed offset. In the example given for FIG. 1, the twelfth least significant bit and all less significant bits would be added to the twelfth least significant bit of the address of the instruction. This would produce a 12-bit result and a 1 bit carry. The 12-bit result is then substituted for the displacement in the instruction, and in the example shown in FIG. 2, an unused bit in cached instruction 252 is used to store a carry 254. The resulting modified instruction is the value stored into the instruction cache.

It is often the case that the least significant bits in a displacement are assumed to be zero, and are not actually given in the instruction. It is also often the case that a given displacement can have either a positive or negative value. These situations do not significantly alter how the invention operates. How to adapt the invention to these situations is obvious to one of ordinary skill in the art.

Figure 3:
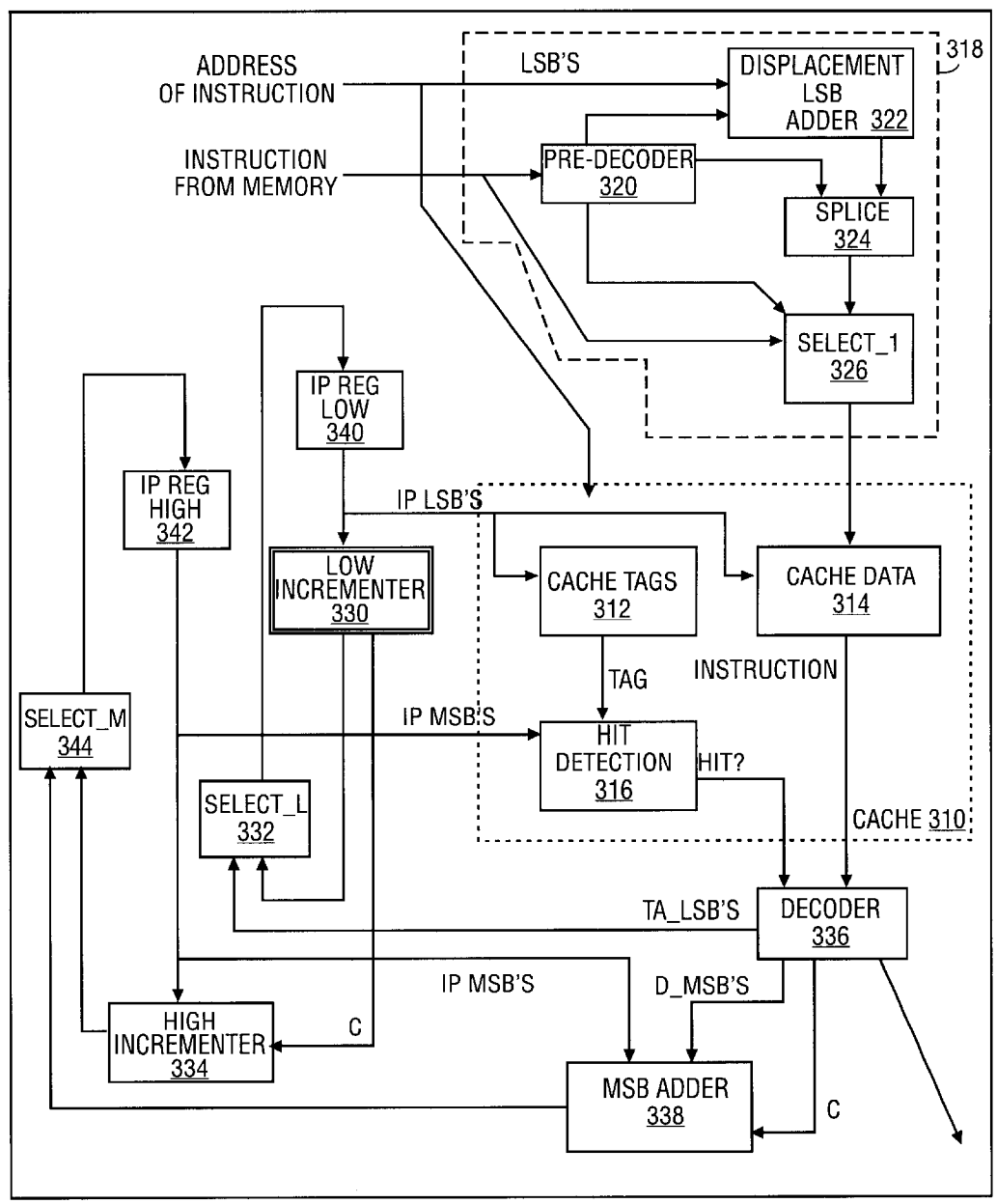
FIG. 3 is a block diagram of the system for speeding sequential access of the cache configured in accordance with one embodiment of the present invention.

FIG. 3 shows one embodiment of the present invention where two processes are represented: the process of putting information into a cache, and the process of fetching information from the cache. FIG. 3 contains a cache 310, a set of cache tags 312, a set of cache data 314, and a hit detection unit 316.

In the process of putting information into cache 310, if the data being stored is recognized as being an IP+displacement branch, it is modified, such as by the process discussed for FIG. 2. An instruction modification unit 318 containing a pre-decoder 320, a displacement adder 322, a splice unit 324, and a select_I unit 326, shown at the top of the diagram, performs the modification. If pre-decoder 320 recognizes the instruction as an IP+displacement branch, the modified form of the instruction is stored into cache 310. Otherwise, the unmodified form is stored.

Figure 1:
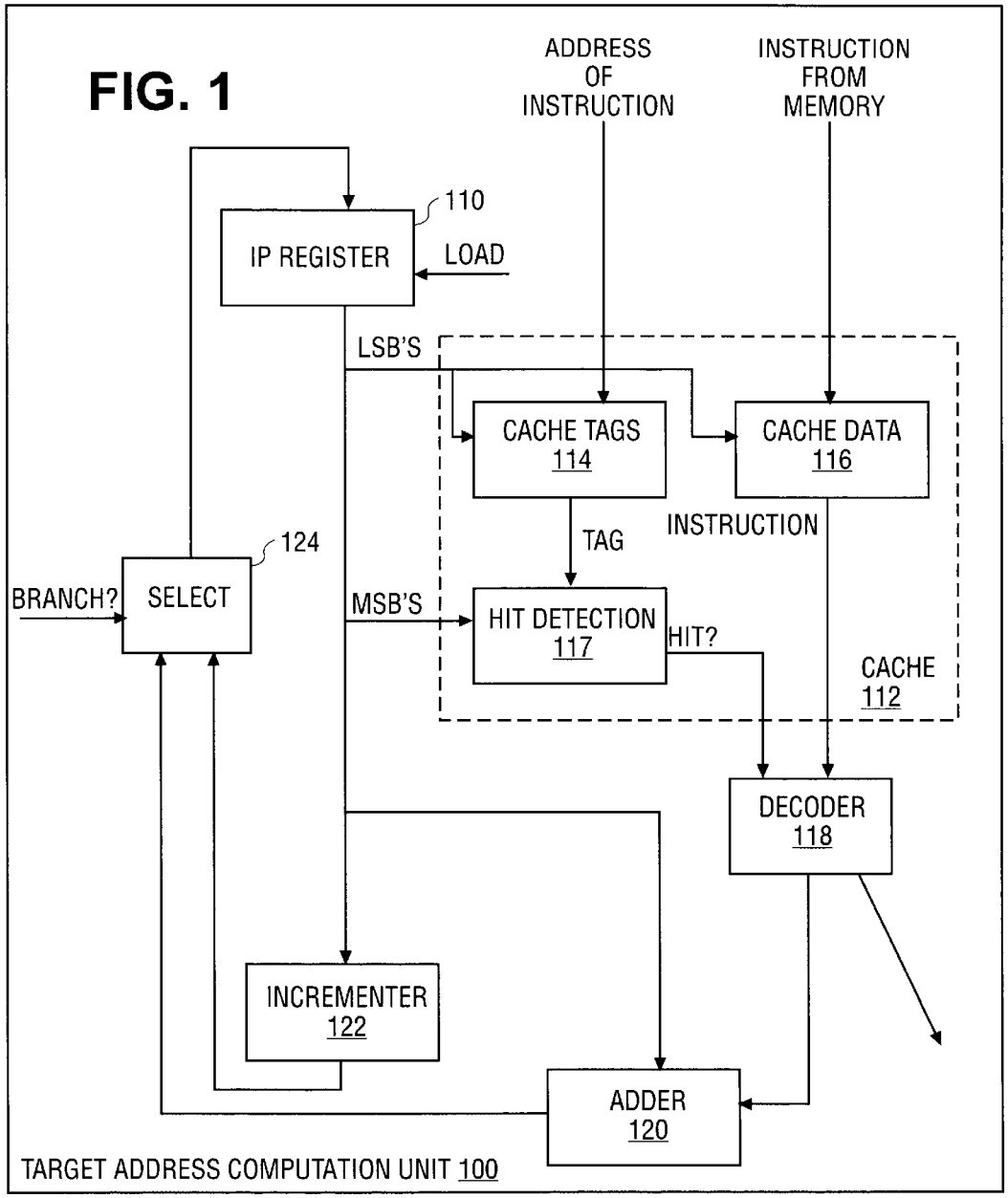
FIG. 1 is a block diagram of a prior art target address computation unit.

The process of fetching information from the cache is altered, when compared to FIG. 1, by splitting the address generation portion of that process into two halves that can complete at different times. Those bits needed to select a set within cache 310 are determined via a fast path, which includes a select_L unit 332, an IP reg low unit 340 to store the lower portion of the IP, and a low incrementer 330. This path selects the output of the lower part of an incrementer 330 if no branch has occurred, or the pre-calculated bits stored into cache 310 if an IP+displacement branch has been detected. If another form of branch is implemented (such as a return from subroutine, or a branch to an address specified by a general purpose register), then another input to select_L unit 332 would be used to route the address generated by that branch into the loop. This is not shown in the diagram but is obvious to one of ordinary skill in the art.

Those bits used in hit detection unit 316 (the more significant bits) are determined by using a select_M unit 344 to select either: (1) the output generated by high incrementor 334, which contains the bits from the upper part of the incrementer; or (2) the output of MSB adder 338, which provides the addition operation of the more significant bits of the displacement to the more significant bits of the appropriate address, taking into account the carry from displacement adder 322. The more significant bits of the displacement (labeled "D_MSb's" in FIG. 3) and the carry from the earlier operation of displacement adder 322 (labeled "C" in FIG. 3) are provided by decoder 336 from the modified instruction that is stored in cache 310. Again, if another form of branch is possible, then another input to select_L unit 332 may be used to route the address generated by that branch into the loop. This is not shown in the diagram but is obvious to one of ordinary skill in the art.

The circuit used to compute the more significant bits that are used in the hit calculation takes longer (starting from the moment the branch was fetched from the cache) than the circuit used to obtain the less significant bits used in the set determination, because of the presence of the adder in the former path. However, because hit determination in a set-associative cache does not start until after the tags have been fetched from the cache, some or all of the extra time taken by the add occurs during the cache access, and therefor does not add to the total time that the operation takes.

Two possible relationships between the displacement size and the number of bits needed to address the cache have been discussed: (1) where the displacement size is equal to the number of bits needed to address the cache; and (2) where the displacement size is greater than the number of bits needed to address the cache. In both of these cases, at most one extra bit per IP-relative branch instruction is required to store the carry since the result of the pre-calculation is stored, instead of some or all of the bits of the displacement.

In cases where the displacement size is smaller than the number of bits needed to address the cache, more difficulty is encountered. In this case, two options exist: either pre-compute enough bits to address the cache and add additional storage to the cache to make room for these extra bits; or to use only one bit of additional storage (for the carry) and have an incrementer that used this carry to compute the remaining bits needed to access the cache. It is to be noted that this is still be faster than doing the entire add operation.

Figure 4:
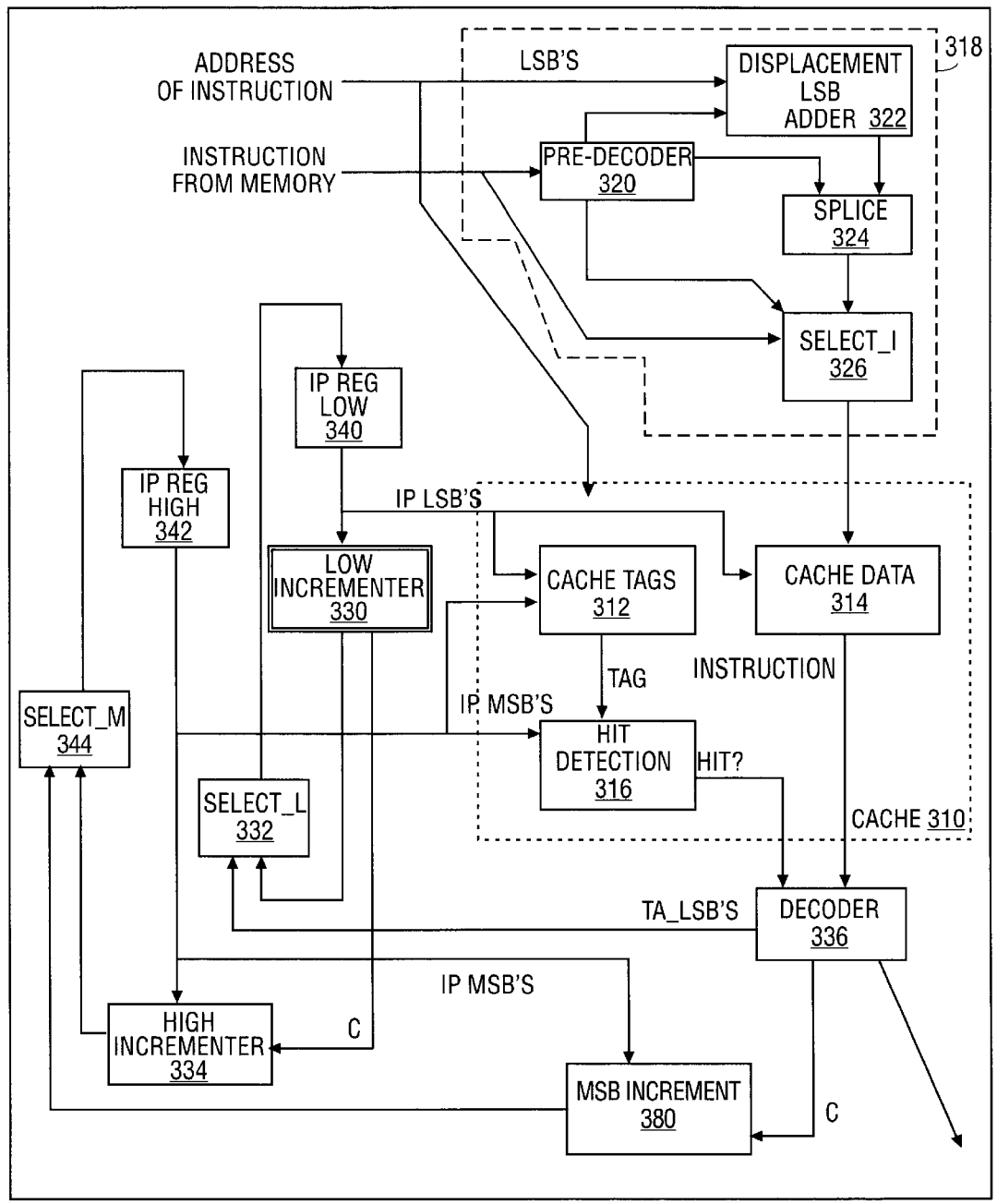
FIG. 4 is a block diagram of the system for speeding sequential access of the cache configured in accordance with another embodiment of the present invention.

FIG. 4 illustrates one embodiment of a circuit that exercises the latter option. It is noted that a further refinement of FIG. 4 would be to split MSB incrementer 380 and the latches for the MSB's into separate units, one of each that handles those bits needed to address the cache and another of each for those bits used in the hit comparison. This would further speed the operation.

In some instruction sets, it is possible to mistake a word in the instruction stream for an instruction when it is not an instruction. In this case, it is possible that pre-calculating the addition of the displacement and IP, and substituting it for the displacement, would be inappropriate. In this case, a circuit to reverse the transformation would be needed. This circuit would simply subtract the IP of the instruction word from the pre-calculated value that was substituted for what was thought to be a displacement, and the result would be the original value that had been in that field.

The embodiment described above requires fewer additional hardware than a traditional branch-target buffer to implement, and requires simpler control circuitry. Moreover, the system may be tied to current branch prediction systems in much the same way as is a branch-target buffer. Note that a branch-target buffer can be used with any kind of branch, whereas the system described above only applied to IP-relative branches. Thus, a processor containing an implementation of the current invention could use the two techniques together by using this invention for IP-relative branches and a mechanism similar to a branch target buffer for all other branches. In such a configuration, in architectures where IP-relative branches account for the majority of branches, the branch target buffer could be considerably smaller without a reduction in performance.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method comprising:
    detecting a branch instruction having an address and containing a first set of bits representing a displacement value; and
    generating a modified instruction containing a second set of bits representing a combination based on said first set of bits and said address.

2. A method as in claim 1 further comprising:
    storing said modified instruction in a cache.

3. A method as in claim 2 wherein the second set of bits represents the addition of a low order portion of said address to a low order portion of said displacement value to obtain a modified displacement value.

4. A method as in claim 3 further comprising:

including a carry bit from said addition as part of said modified instruction.

5. A method as in claim 3 further comprising:

retrieving said modified instruction from said cache and adding a high order portion of said address to a high order portion of said modified displacement value.

6. A method as in claim 3 further comprising:

accessing said cache to retrieve said modified instruction, wherein the generation of said modified instruction occurs concurrently with accessing said cache.

7. A method as in claim 1 wherein said displacement value is positive.

8. A method as in claim 2 wherein a size of said displacement value is greater than or equal to the number of bits required to access the cache.

9. A method as in claim 2 wherein a size of said displacement value is less than the number of bits required to access said cache.

10. A method as in claim 1 wherein said branch instruction is a PC-relative branch.

11. A processor comprising:

a cache;

an instruction modification unit to modify an instruction by combining a plurality of the low order bits of an instruction's displacement value with a plurality of the low order bits of an instruction's address, and to store a resulting modified instruction in the cache;

a first register to store an upper portion of an instruction pointer, and coupled to access the cache;

a decoder coupled to an output of the cache, to provide a first group of bits representing a plurality of high order bits of a modified instruction's displacement value stored in the cache;

an adder coupled to an output of the decoder and the output of the first register, to combine the first group of bits with the contents of the first register.

12. The processor of claim 11 wherein the instruction's displacement value is positive.

13. The processor of claim 12 wherein the instruction's displacement size is greater than or equal to the number of bits required to address the cache.

14. The processor of claim 12 wherein the instruction's displacement size is less than the number of bits required to address the cache.

15. The processor of claim 11 further comprising:

logic coupled to the instruction modification unit to detect branch instructions from among other types of instructions.

16. The processor of claim 15 wherein the branch detection logic can detect PC-relative branch instructions.

17. The processor of claim 11 further comprising:

a second register to store a lower portion of the instruction pointer, and coupled to access the cache;

a first incrementer having an input coupled to the output of said first register;

a first selector having inputs coupled to the first incrementer and the adder, and having an output coupled to the first register, such that a content of the first register is replaced by its incremented value or by the addition of a content of the first register and a plurality of high order bits of the modified instruction's displacement value;

a second incrementer having an input coupled to the output of said second register;

a second selector having an input coupled to the second incrementer, another input coupled to said decoder to receive a second group of bits, representing some low order bits of the modified instruction's displacement value, and an output coupled to said second register, such that a content of the second register is replaced by its incremented value or by a plurality of low order bits of the modified instruction's displacement value.

18. The processor of claim 11 wherein:

said cache contains set selection logic with an input coupled to said first register and hit detection logic with an input coupled to said second register.

\* \* \* \* \*